May 27, 1930.                N. E. MAEDGEN                1,760,202
WASHING MACHINE APPLIANCE
Filed March 9, 1929            2 Sheets-Sheet 2
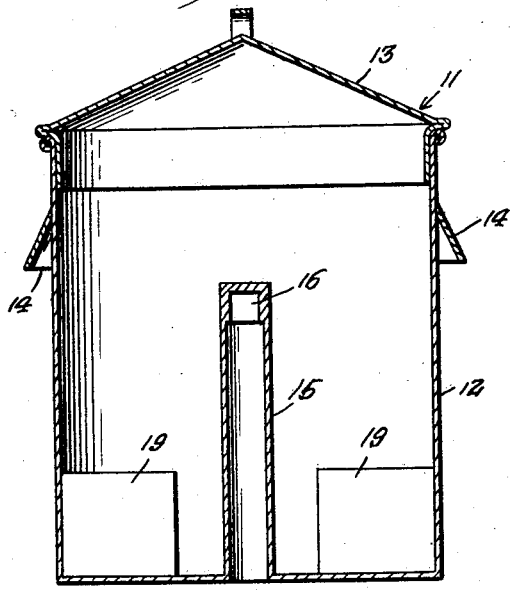
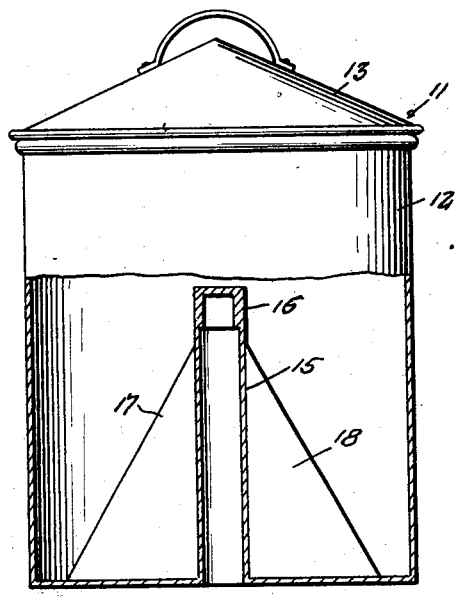
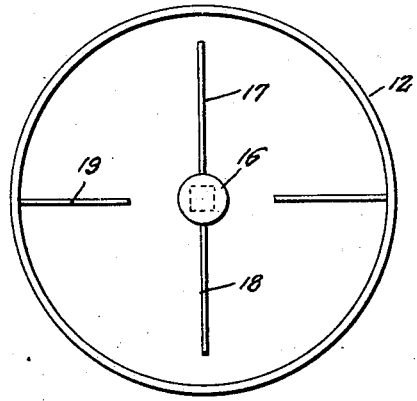
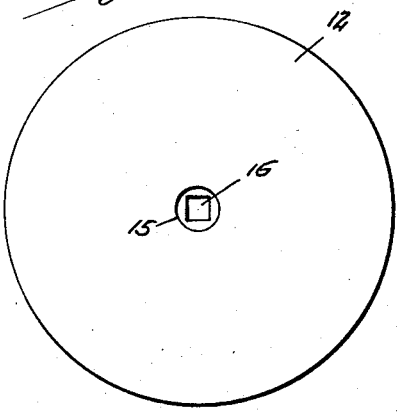
Inventor
Nannie E. Maedgen,
By Clarence A. O'Brien
Attorney Patented May 27, 1930

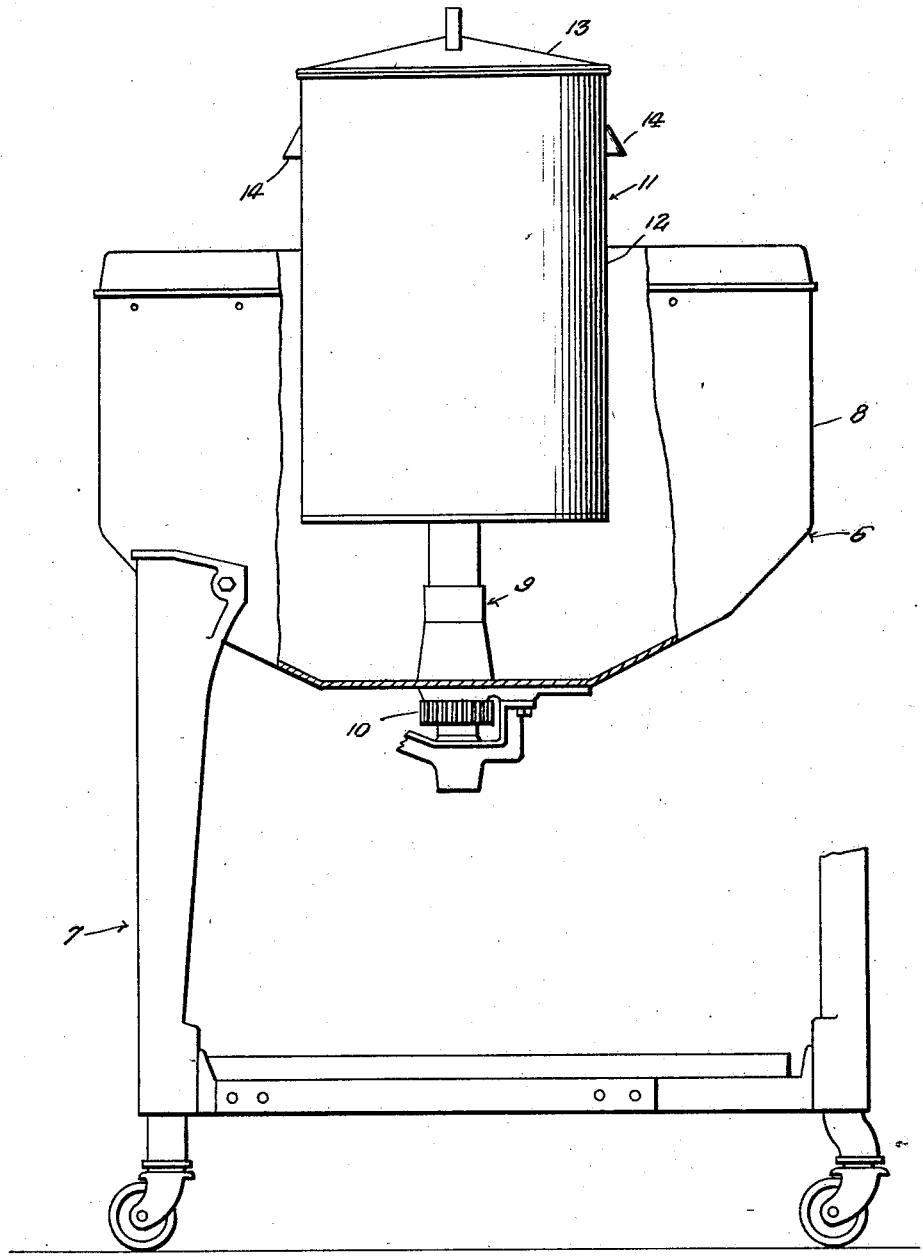

1,760,202

UNITED STATES PATENT OFFICE

NANNIE E. MAEDGEN, OF TROY, TEXAS

WASHING-MACHINE APPLIANCE

Application filed March 9, 1929. Serial No. 345,734.

This invention relates to an improved appliance in the form of an attachment for use in conjunction with a conventional type of clothes washing machine, and it has more particular reference to a device which is adapted to take the place of a removable gyrator, and which is constructed for making edible foods, such as batter, ice cream, custards and the like.

More explicitly expressed, the invention has reference to an appropriately sized container for the materials to be agitated, the container being provided with internal agitating and dashing means and being constructed with a centralized coupling, which is adapted to fit over and be operatively connected with the oscillatory shaft, which serves to actuate the correspondingly actuated gyrator, the appliance being put in place on the shaft after the gyrator is moved.

The appliance is especially, but not necessarily, adapted for turning batter, and it is especially advantageous in that it is of unusually simplified and economical construction and susceptible of accomplishing the desired results in an efficient and dependable manner.

Other features and advantages will become more readily apparent from the following description and drawings.

In the drawings:

Figure 1 is a side view of a portion of a conventional form of clothes washing machine showing the gyrator removed and the butter churn or appliance substituted therefor.

Figure 2 is a vertical sectional view through the appliance removed from the tub.

Figure 3 is a view at right angles to Figure 2.

Figure 4 is a top plan view with the lid removed.

Figure 5 is a bottom plan view.

In the drawings, the reference character 6 designates generally a conventional type of clothes washing machine. This may be of the "Maytag" variety. It includes a roller supported portable stand 7, and a customary tub 8. Inside of the tub is the upstanding oscillatory encased gyrator operating shaft generally designated by the reference character 9. Incidentally the gyrator is not shown but it simply comprises a movable detail having a bladed portion at its bottom for agitation of water. The shaft receives motion from the pinion 10 which is operated by electrically driven operating means (not shown). The food making appliance is generally designated by the reference character 11 and as before stated it may be utilized for making butter, ice cream, custards and similar products made by an agitating and dashing operation.

The appliance comprises, as seen in Figure 2, a cylindrical container 12 open at its top and provided with a removable cover or lid 13. On opposite sides are lifting hand grips 14. At the center of the interior is an upstanding tubular shaft coupling 14, whose upper end is reduced as at 16, to permit it to fit over and have operative connection with the oscillatory gyrator shaft 9. Formed integral with this tube 15 and on diametrically opposite sides are the substantially triangular baffle plates or webs 17 and 18 which extend outwardly to a point remote from the walls of the cylinder 12. At right angles to these are small rectangular baffles or plates 19 which extend inwardly to a point remote from tube 15. These plates cooperate in forming a novel dasher for agitating the mixture.

It is obvious that when the material to be placed in the container, the container is connected with the oscillatory shaft 9 through the medium of the coupling means 15 and 16 and the shaft is set into operation, the material in the container will be agitated and dashed in a manner to be converted into food.

The device as before stated is principally intended for making butter and therefore is in the form of a butter churn. It has been found in practice that water of an appropriate temperature may be arranged in the tube to surround the churn to facilitate and expedite the churning operation. Of course, in the case of making the ice cream, the tub will be packed with ice. Thus it is possible to make frozen food confections, butter, butter milk and the like.

The particular advantage is that the device may be used with the conventional clothes washing machine without requiring alterations of existing details. Hence it is a handy appliance for domestic use and which is an accessory which may or may not be sold with the washing machine to add decidedly to the degree of utility thereof.

It is thought, however, that the advantages, construction and features will be quite clear when considering the description in conjunction with the drawings. Therefore a more lengthy description is regarded as unnecessary.

Minor changes in the shape, size and rearrangement of details coming within the field of invention claimed may be resorted to, in actual practice if desired.

Having thus described my invention, what is claimed as new is:

An attachment of the character described comprising a container, means mounted axially on and extending into said container for coupling the same to an operating shaft, agitating baffles extending inwardly from the walls of the container to a point remote from the coupling means, and agitating baffles extending outwardly from the coupling means to a point remote from the cylinder walls, and in overlapping relation to the first mentioned baffle.

In testimony whereof I affix my signature.

Mrs. NANNIE E. MAEDGEN.